(12) United States Patent
Uchimi

(10) Patent No.: US 7,974,082 B2
(45) Date of Patent: Jul. 5, 2011

(54) DISPLAY APPARATUS

(75) Inventor: Tasuku Uchimi, Chigasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 345 days.

(21) Appl. No.: 12/198,651

(22) Filed: Aug. 26, 2008

(65) Prior Publication Data

US 2009/0058235 A1    Mar. 5, 2009

(30) Foreign Application Priority Data

Aug. 27, 2007    (JP) .................... 2007-220149

(51) Int. Cl.
G06F 1/16    (2006.01)

(52) U.S. Cl. ............ 361/679.21; 361/679.22; 248/917; 248/918; 312/223.1; 312/223.2; 349/58

(58) Field of Classification Search ............ 361/679.21, 361/679.22
See application file for complete search history.

(56) References Cited

U.S. PATENT DOCUMENTS

| | | | | |
|---|---|---|---|---|
| 4,659,869 A * | 4/1987 | Busby | ............ | 174/354 |
| 5,120,903 A * | 6/1992 | Tam | ............ | 174/354 |
| 6,559,908 B2 * | 5/2003 | Hiratsuka et al. | ............ | 349/58 |
| 7,042,156 B2 * | 5/2006 | Sakamoto | ............ | 313/583 |
| 7,109,976 B2 * | 9/2006 | Cobian | ............ | 345/173 |
| 7,211,741 B2 * | 5/2007 | Kim et al. | ............ | 174/381 |
| 7,612,490 B2 * | 11/2009 | Kubota et al. | ............ | 313/112 |
| 7,679,924 B2 * | 3/2010 | Davis et al. | ............ | 361/756 |
| 2001/0043466 A1 * | 11/2001 | Durr et al. | ............ | 361/816 |
| 2005/0117283 A1 * | 6/2005 | Lee et al. | ............ | 361/681 |
| 2006/0158835 A1 * | 7/2006 | Lin et al. | ............ | 361/681 |
| 2008/0094816 A1 * | 4/2008 | Murayasu | ............ | 361/818 |
| 2008/0186662 A1 * | 8/2008 | Lee | ............ | 361/681 |

FOREIGN PATENT DOCUMENTS

| | | |
|---|---|---|
| JP | 61-187174 | 11/1986 |
| JP | 01-147438 | 10/1989 |
| JP | 11-237844 | 8/1999 |
| JP | 2000-179695 | 6/2000 |
| JP | 2001-308564 | 11/2001 |
| JP | 2003-131580 | 5/2003 |
| JP | 2003-278916 | 10/2003 |
| JP | 2005-072517 | 3/2005 |
| JP | 2007-206173 | 8/2007 |

* cited by examiner

Primary Examiner — Jayprakash N Gandhi
Assistant Examiner — Anthony Q Edwards
(74) Attorney, Agent, or Firm — Canon USA Inc IP Division

(57) ABSTRACT

A display apparatus includes a front plate and an elastic member fitted to the front plate along the periphery thereof. The elastic member is pressed against a bezel by a pressing metal part. The elastic member includes a hook-shaped portion and a projecting portion at the end faces thereof. The hook-shaped portion is engaged with an edge portion of the front plate so that the elastic member is prevented from falling off from the front plate. Therefore, it is not necessary to use an adhesive in the assembly process.

4 Claims, 10 Drawing Sheets

DISPLAY APPARATUS

BACKGROUND OF THE INVENTION

1. Field of the Invention

The present invention relates to display apparatuses, such as plasma display apparatuses, and more particularly, to a display apparatus having a characteristic dustproof structure.

2. Description of the Related Art

Recently, display apparatuses, such as plasma display apparatuses and liquid crystal display apparatuses, capable of displaying images on large screens have been put to practical use, and there has been an increasing demand for such a display apparatus.

A plasma display apparatus, for example, includes a plasma display panel and an optical filter on a front side of the plasma display panel at which an image is displayed. The optical filter has a color-tone correcting function, a contrast emphasizing function, an electromagnetic-wave blocking function, etc. and serves a front plate.

The front plate is made of a transparent or translucent material, such as glass. To obtain a glass plate having the above-described functions, a film is attached to a surface of the glass plate and etching is performed to impart conductivity. The front plate is arranged to be spaced from the plasma display panel by several millimeters. Thus, heat generated by the panel is blocked and the panel is prevented from receiving an impact from the outside.

In general, liquid crystal display apparatuses are free from a front plate having functions as those of the front plate included in the plasma display apparatuses. However, in the case where a liquid crystal display apparatus has a touch panel function, a touch panel is provided in front of a liquid crystal panel as a front plate.

As described above, the front plate placed in front of the plasma display panel or the liquid crystal panel is spaced from the plasma display panel or the liquid crystal panel by several millimeters. Therefore, if foreign matter, such as dust and cigarette smoke, enters this space, the foreign matter adheres to the front surface of the panel or the back surface of the front plate. This may cause display defects such as reduction in contrast, stain, etc.

To prevent the entrance of foreign matter, a cushion can be placed between the panel and the front plate so as to seal an image display area (see, for example, Japanese Patent Laid-Open Nos. 2003-131580 and 11-237844).

FIG. 12 is a sectional view of a plasma display apparatus described in Japanese Patent Laid-Open No. 2003-131580.

A bezel 2 has an opening 2a at which an image display area of a panel body 1 on the front side thereof is exposed. A transparent front plate 3, which is larger than the opening 2a, is disposed so as to cover the opening 2a by being held between a pressing metal part 6 and the bezel 2 at a peripheral portion thereof.

An elastic member 4 made of a material such as polyurethane rubber, silicone rubber, or acrylic rubber is disposed between the panel body 1 and the front plate 3 so as to extend along the periphery of the image display area. The panel body 1 is in contact with the elastic member 4, which is in contact with the front plate 3. Since the image display area is surrounded by the elastic member 4, the foreign matter can be prevented from entering the image display area. An electric circuit board 7 is disposed behind (on the right in the figure) of the panel body 1.

In the dustproof structure of the related art shown in FIG. 12, an adhesive member, such as double-faced adhesive tape, is used to fix the elastic member 4, such as a cushion, disposed along the periphery of the image display area. The adhesive member is attached to the panel body or the front plate.

Display apparatuses with large screens, such as 50-inch to 60-inch or larger screens, generally have an outer width of 1000 mm or more. Thus, the length of the elastic member is also 1000 mm or more. Since the width of the elastic member is small, such as 10 mm, it is difficult to reliably attach the elastic member.

More specifically, when a long elastic member is fixed with an adhesive, the elastic member is often fixed at a position displaced from the desired position or in a non-linear manner. In such a case, there is a risk that the elastic member will interfere with another member or be exposed at the bezel opening. It is desirable to avoid such a situation in view of the manufacturing process and quality.

In addition, when the elastic member, which is fixed with an adhesive, is removed, there is a possibility that the adhesive remains on the panel body or the front plate. This is undesirable in view of disassemblability.

SUMMARY OF THE INVENTION

The present invention is directed to a display apparatus in which a dustproof elastic member can be easily attached and detached.

According to an aspect of the present invention, a display apparatus includes a bezel defining a portion of a housing that houses a display panel, the bezel having an opening at which an image display area at a front side of the display panel is exposed; a front plate disposed in front of the display panel so as to cover the opening; and a dustproof member arranged between the display panel and the front plate along an outer periphery of the image display area. The dustproof member includes a fitting portion sized and shaped to fit an edge portion of the front plate and installed such that the fitting portion is fitted to the edge portion. The dustproof member includes a contact portion pressed by the display panel.

Other features and advantages of the present invention will be apparent from the following description taken in conjunction with the accompanying drawings, in which like reference characters designate the same or similar parts throughout the figures thereof.

DESCRIPTION OF THE EMBODIMENTS

Exemplary embodiments of the present invention will now be described in detail in accordance with the accompanying drawings.

Figure 1:
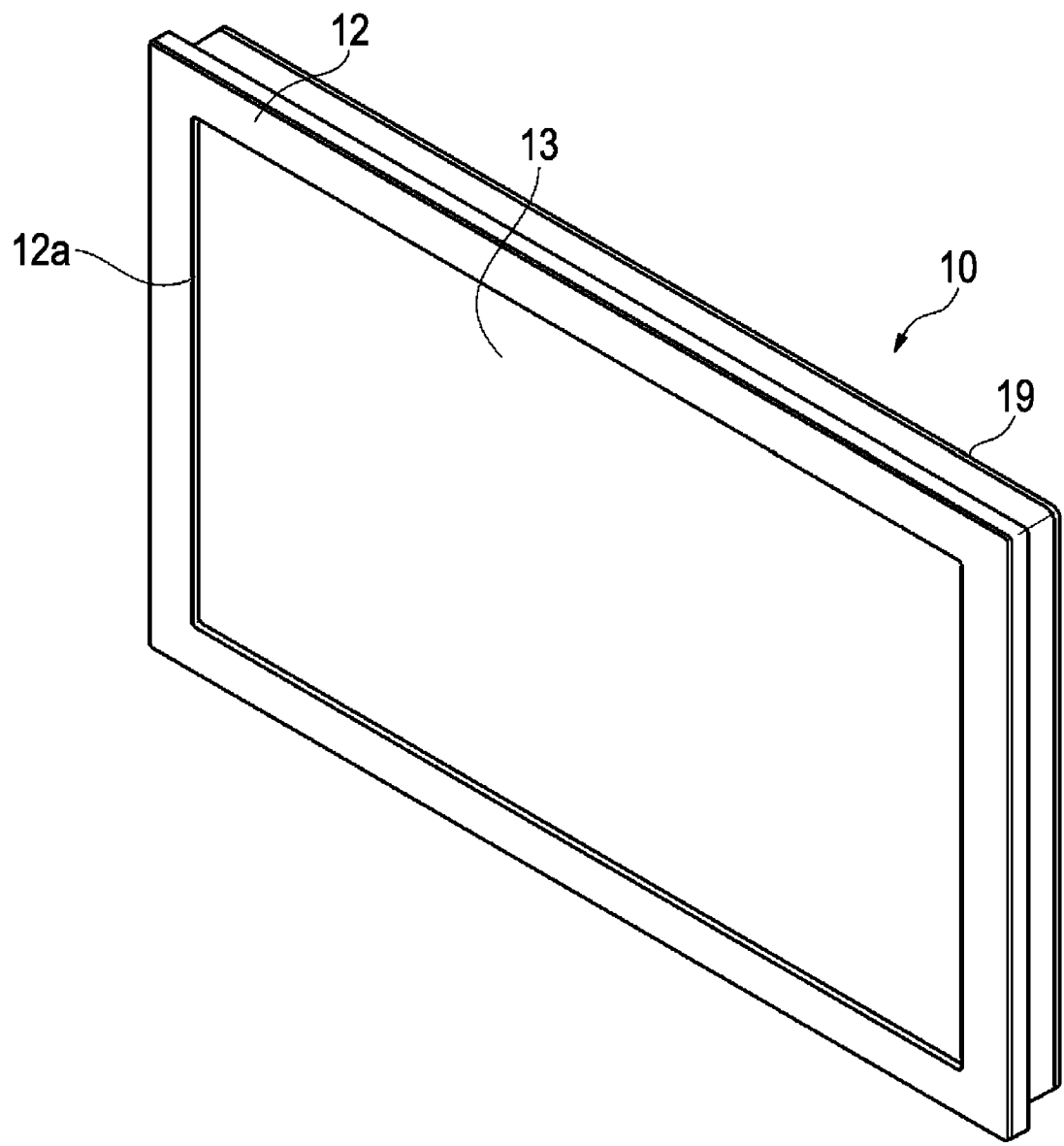
FIG. 1 is a perspective view of a display apparatus according to an embodiment of the present invention.
Figure 2:
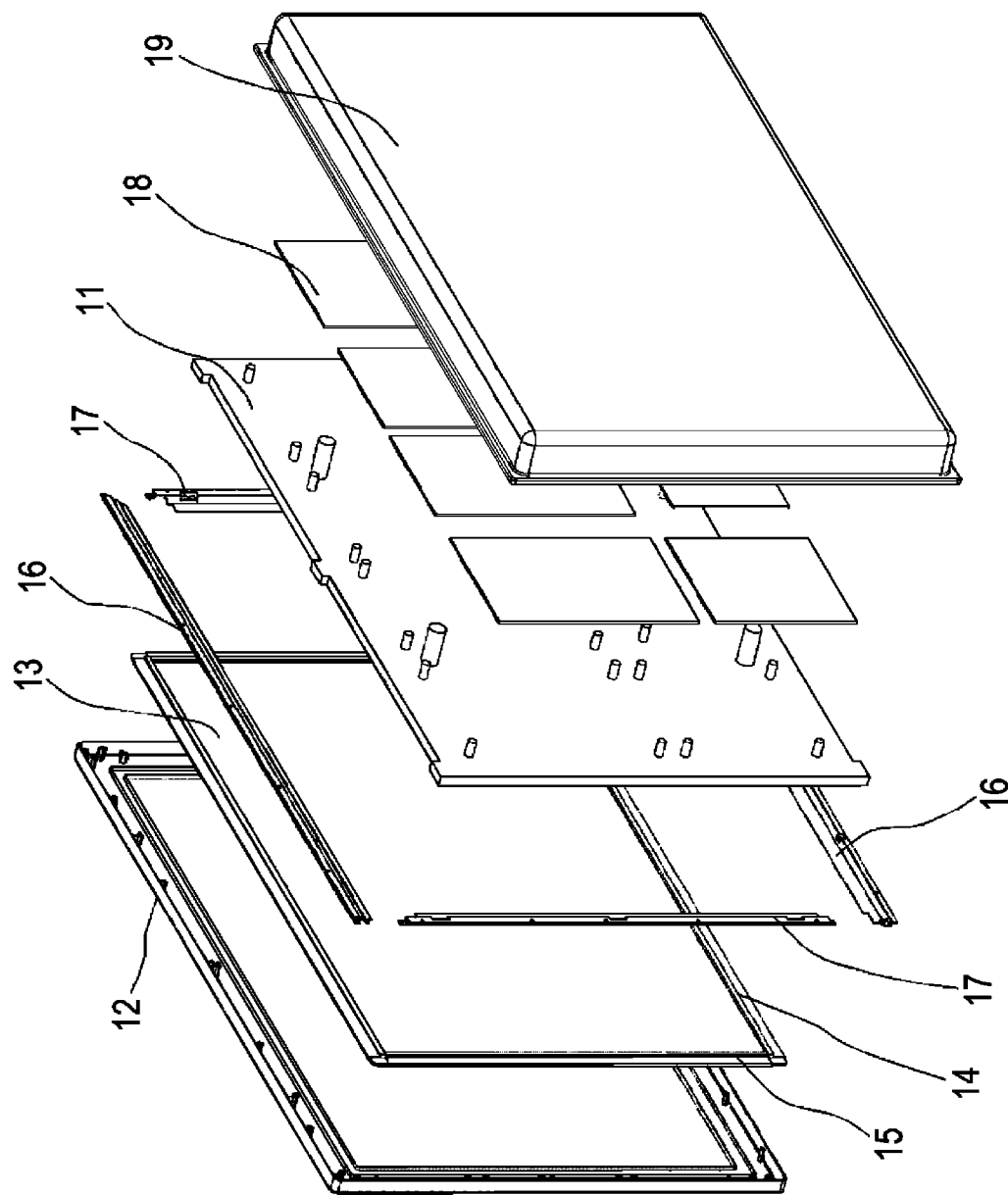
FIG. 2 is an exploded perspective view of the display apparatus according to the embodiment.

FIG. 1 is a perspective view of a display apparatus according to an embodiment of the present invention. FIG. 2 is an exploded perspective view of the display apparatus according to the embodiment.

Referring to FIG. 1, a housing 10 of the display apparatus includes a bezel 12 that forms a portion of the housing 10, a rear cover 19, and a front plate 13. The bezel 12 has an opening 12a formed in a front surface thereof so as to expose an image display area.

In FIG. 2, a panel body 11 may be applied to any type of thin image-display panels such as electron emission type, plasma discharge type, liquid crystal type, fluorescent display tube type, and organic electroluminescence (EL) type.

An electric circuit board 18 is attached to the back surface of the panel body 11 contained in the housing 10. Elastic members 14 and 15, which function as dustproof members, are fitted to a peripheral portion of the front plate 13. The front plate 13 is held between the bezel 12 and pressing metal parts (metal members) 16 and 17. The pressing metal parts 16 and 17 are provided to press the front plate 13.

First Embodiment

Figure 3:
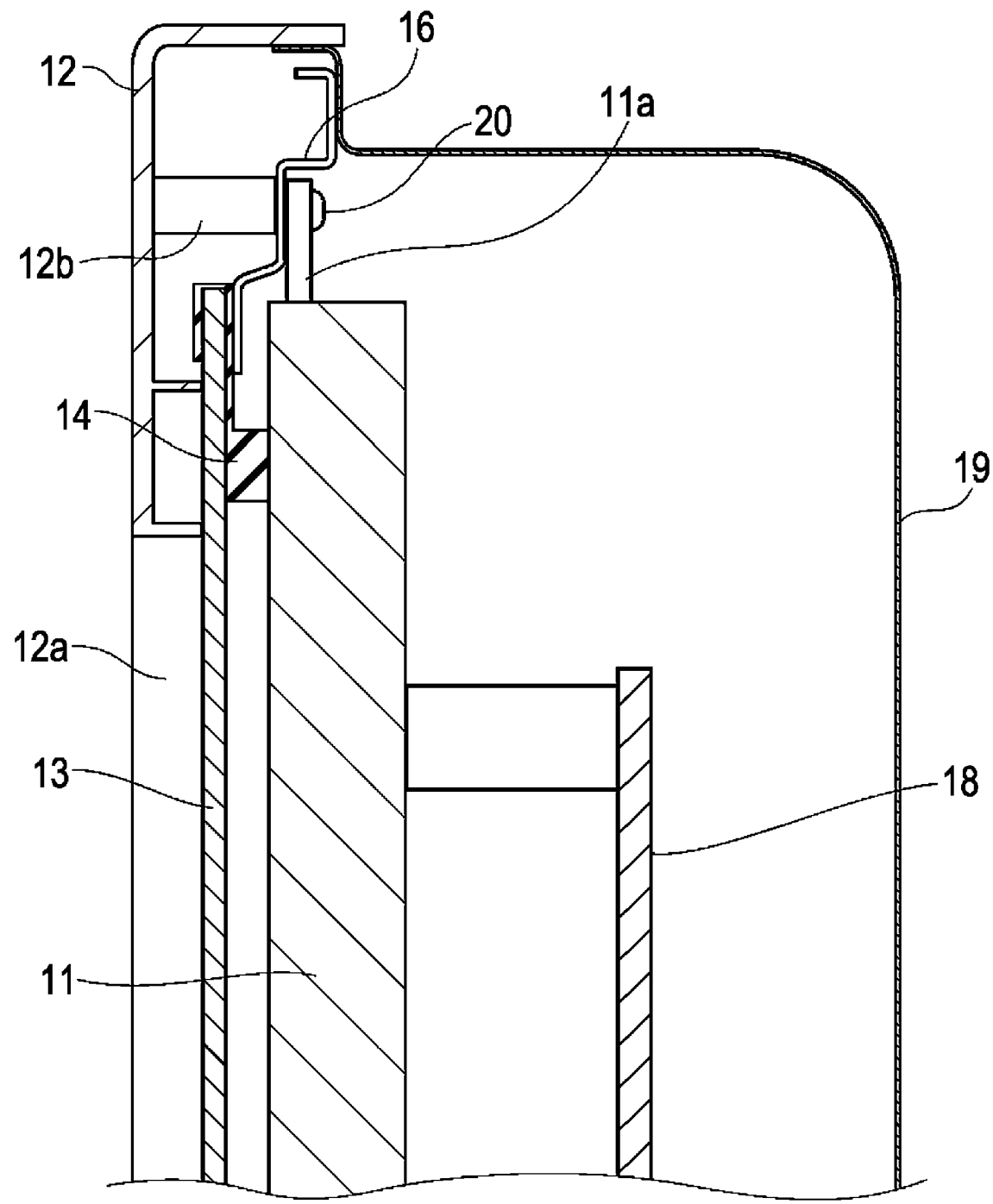
FIG. 3 is a sectional view of an upper section of a display apparatus according to a first embodiment of the present invention.

FIG. 3 is a sectional view of an upper section of a display apparatus according to a first embodiment of the present invention.

Referring to FIG. 3, the elastic member 14 is fitted to a top edge portion of the front plate 13. The elastic member 14 is pressed against the back surface of the front plate 13 by the pressing metal part 16. The panel body 11 has an attachment portion 11a that is fixed to a boss 12b of the bezel 12 with a screw 20. The pressing metal part (metal member) 16 is held between the attachment portion 11a and the boss 12b.

Thus, the elastic member 14 is fitted to the front plate 13, and is pressed against the back surface of the front plate 13 by the pressing metal part 16. Thus, the elastic members 14 is held between the front surface of the panel body 11 and the back surface of the front plate 13. Side edge portions and a bottom edge portion of the front plate 13 are structured similarly to the top edge portion of the front plate 13. Thus, the elastic members 14 and the elastic members 15 are held between the front surface of the panel body 11 and the back surface of the front plate 13 along the outer peripheral portion of the image display area of the panel body 11.

Therefore, the image display area is sealed by the elastic members 14 and 15 so that foreign matter, such as dust, can be prevented from entering the image display area.

Next, the detailed structure in which the elastic members 14 and 15 are attached to the front plate 13 and components included in the structure will be described.

Figure 4:
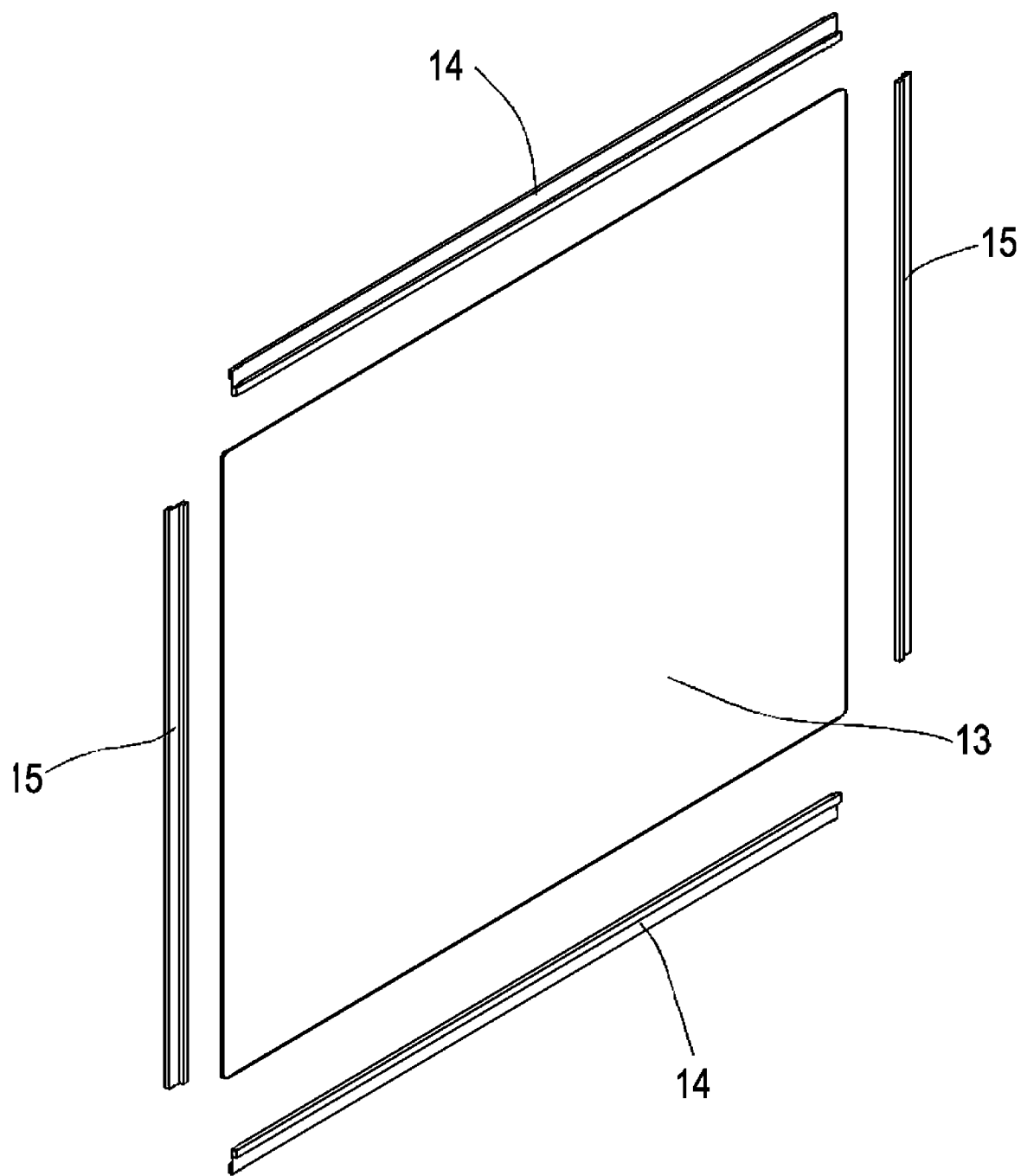
FIG. 4 is an assembly drawing illustrating the step of attaching elastic members, one of which is shown in FIG. 3, to a front plate.
Figure 5:
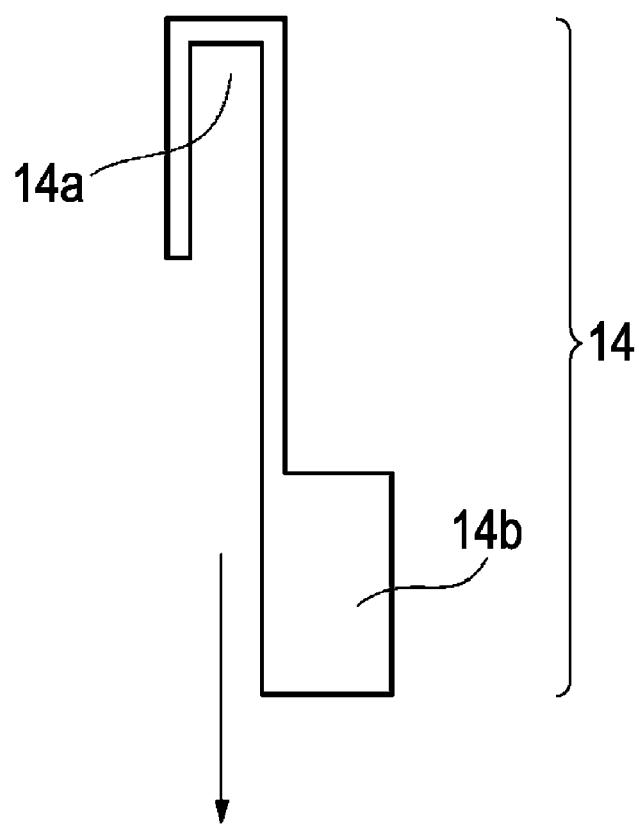
FIG. 5 is a diagram illustrating the manner in which each of the elastic members shown in FIG. 4 is fitted to the front plate.
Figure 5:
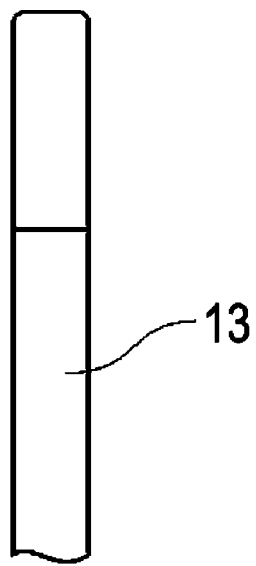

FIG. 4 is an assembly diagram illustrating the step of attaching the elastic members, one of which is shown in FIG. 3, to the front plate. FIG. 5 is a diagram illustrating the manner in which each of the elastic members shown in FIG. 4 is fitted to the front plate.

As shown in FIG. 4, the elastic members 14 and 15 are attached to four sides of the front plate 13. The elastic members 14 are attached to long sides (horizontal sides) of the front plate 13 and the elastic members 15 are attached to short sides (vertical sides) of the front plate 13.

Referring to FIG. 5, each elastic member 14 has a fitting portion 14a and a contact portion 14b. The fitting portion 14a has a hook shape. The fitting portion 14a is tightly fitted to an edge portion of the front plate 13, and is thereby provisionally fixed to the front plate 13. Thus, the elastic member 14 is prevented from being detached from the front plate 13.

At this time, if a gap size of the fitting portion 14a, that is, the width of a gap formed so as to receive the edge portion of the front plate 13, is equal to or smaller than the thickness of the edge portion of the front plate 13, the fitting portion 14a can be tightly fitted to the front plate 13. Therefore, the gap size of the fitting portion 14a is set to be equal to or smaller than the thickness of the front plate 13. Thus, the elastic members 14 can be prevented from falling off even when the front plate 13 is held upright. The contact portion 14b comes into contact with the panel body 11 when the panel body 11 is assembled to the elastic members 14. When the contact portion 14b comes into contact with the panel body 11, the contact portion 14b is pressed toward the front plate 13 and comes into tight contact with the front surface of the attachment portion 11a and the front plate 13.

Thus, the elastic members 14 and 15, each of which has a hook-shaped fitting portion, are provisionally fixed to the edge portions of the front plate 13 and are then fixed by the pressing metal parts 16 and 17. As a result, the elastic members 14 and 15 can be easily attached without using an adhesive or the like, and disassemblability can be improved.

In addition, the fitting portion 14a is positioned by the edge portion of the front plate 13. Therefore, even when the elastic members 13 and 14 are long, they can be substantially linearly disposed along the edges of the front plate 13. As a result, the elastic members can be prevented from interfering with another member or being exposed at the bezel opening due to displacements thereof.

Second Embodiment

Figure 6:
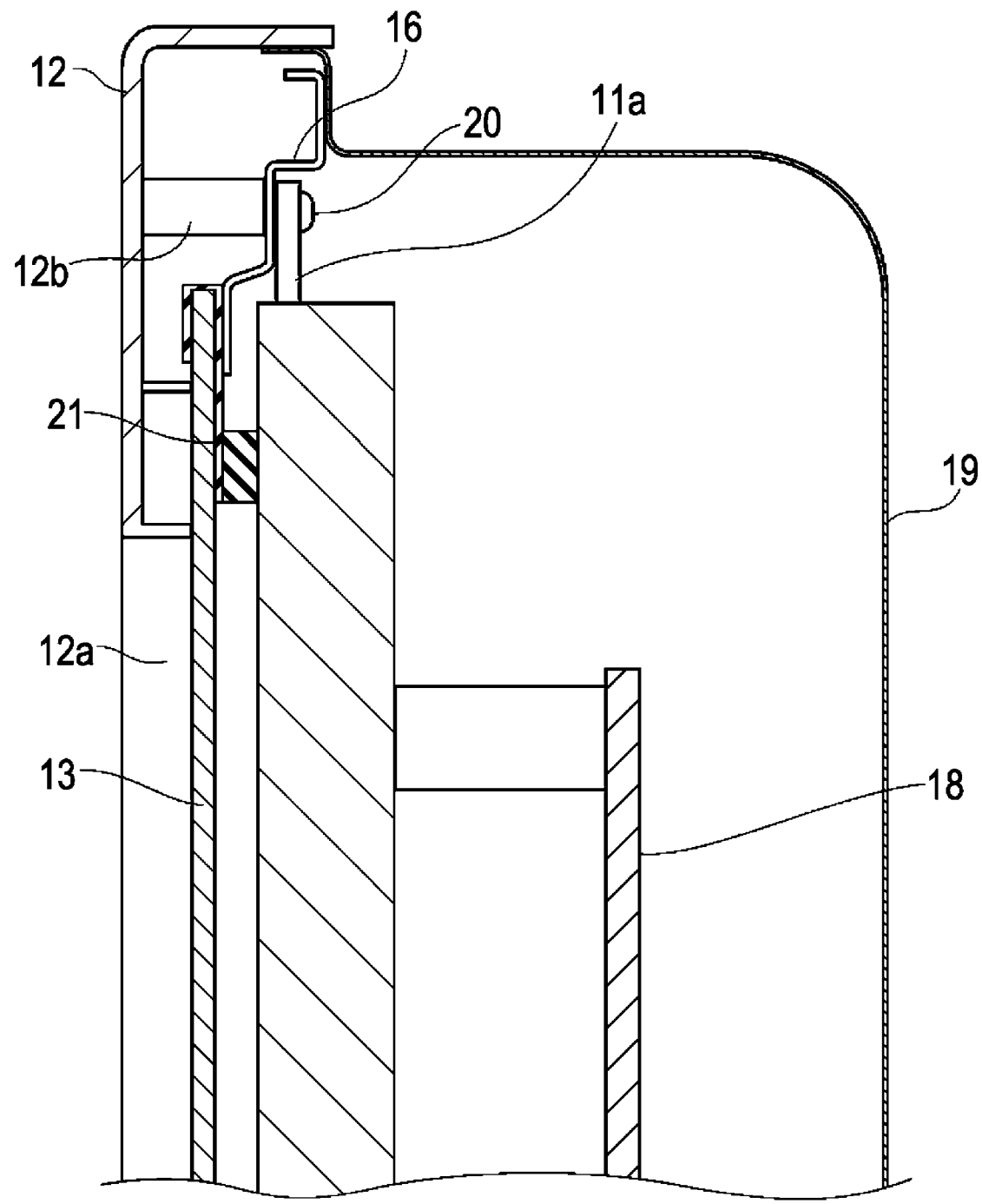
FIG. 6 is a sectional view of an upper section of a display apparatus according to a second embodiment of the present invention.
Figure 7:
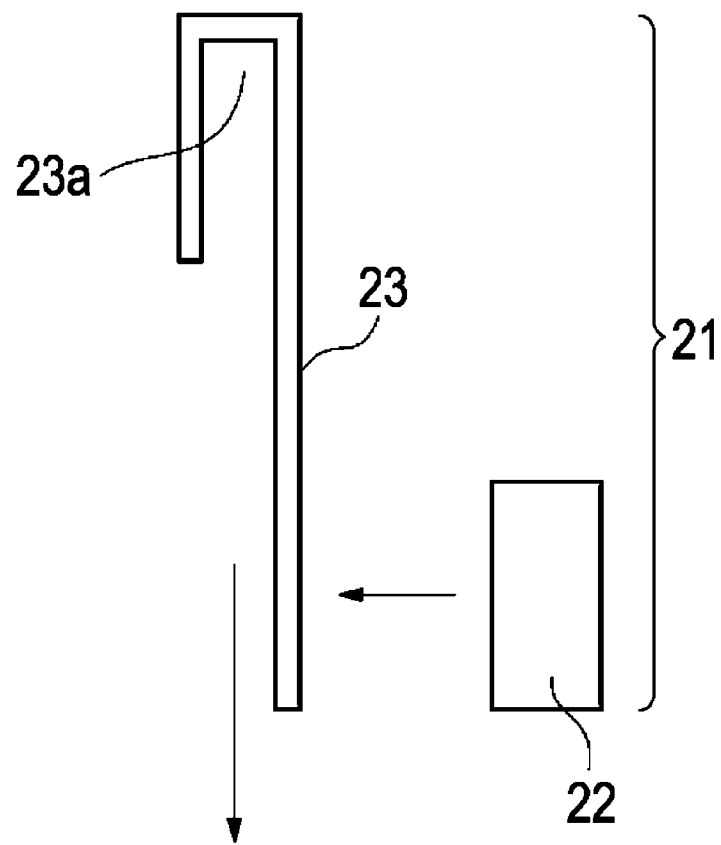
FIG. 7 is a diagram illustrating the manner in which the elastic member shown in FIG. 6 is fitted to the front plate.
Figure 7:
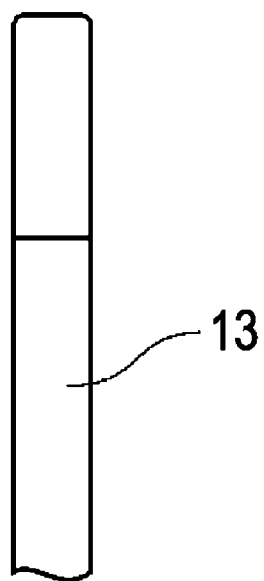

FIG. 6 is a sectional view of an upper section of a display apparatus according to a second embodiment of the present invention. FIG. 7 is a diagram illustrating the manner in which the elastic member shown in FIG. 6 is fitted to the front plate.

In FIG. 6, an elastic member 21 is fitted to a top edge portion of a front plate 13, and is fixed by being pressed against a back surface of the front plate 13 with a pressing metal part (metal member) 16.

In FIG. 7, the elastic member 21 includes an elastic member 22 corresponding to the above-described contact portion and an elastic member 23 corresponding to the above-described fitting portion. The elastic member 22 and the elastic member 23 are fixed to each other with an adhesive or by another fixing method. The elastic member 23 includes a fitting portion 23a, and the fitting portion 23a is hooked to the top edge portion of the front plate 13 so that the elastic member 23, that is, the elastic member 21, is provisionally fixed to the front plate 13.

When a panel body 11 is installed, the elastic member 22, which is adhered to the elastic member 23, is held between the front plate 13 and the panel body 11. If the elastic member 23 is composed of a conductive member, the front plate 13 can be connected to the ground because the front plate 13, of which the back surface is subjected to conductive treatment, is connected to the pressing metal part 16 by the elastic member 23.

If the elastic member 22 is composed of a heat-conductive member, heat generated by the panel body 11 can be dissipated to the front plate 13.

Thus, effects of electrical connection and heat dissipation can be obtained by combining the elastic members 22 and 23 having different functions.

Third Embodiment

Figure 8:
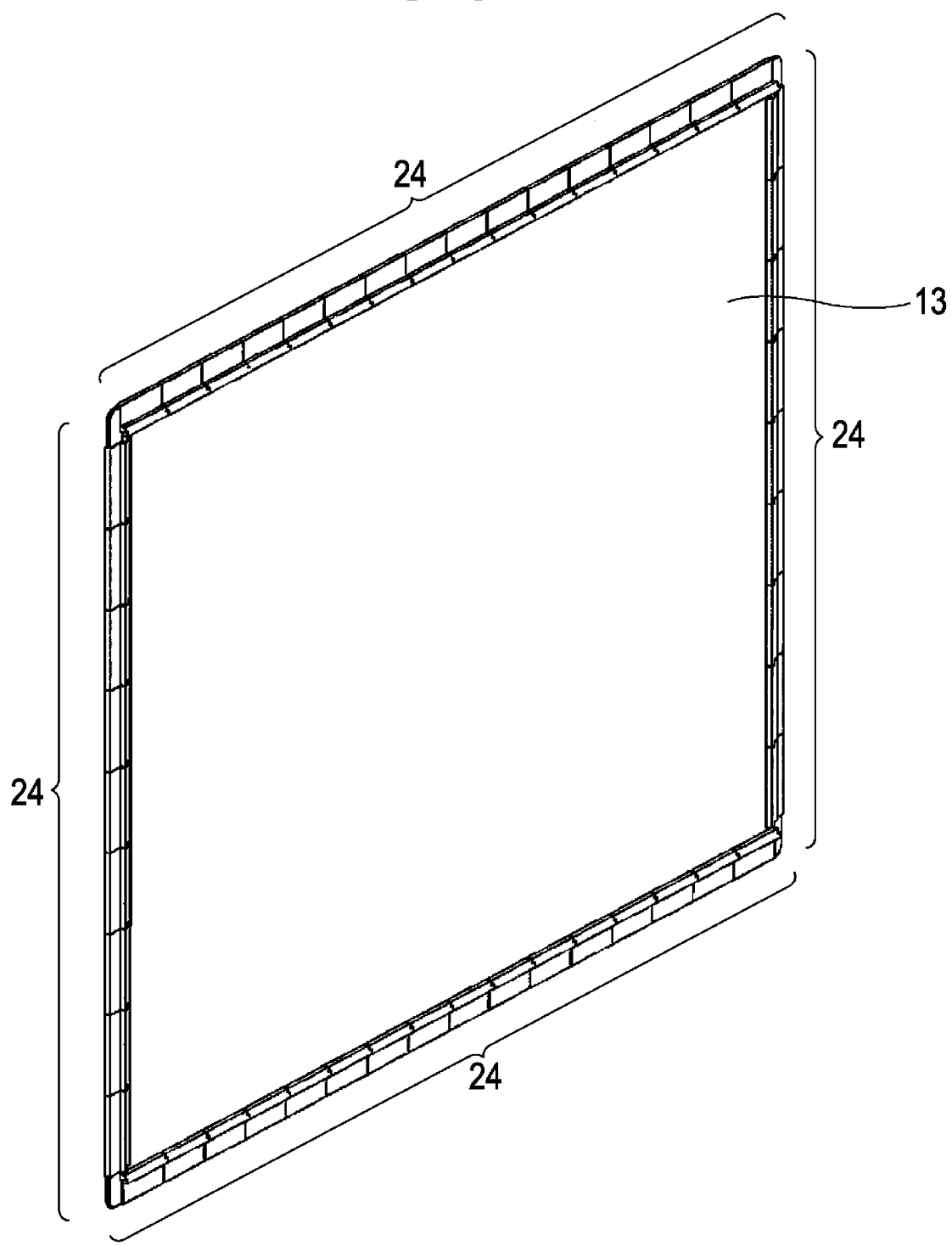
FIG. 8 is a perspective view of a front plate and elastic members fitted to the front plate in a display apparatus according to a third embodiment.

FIG. 8 is a perspective view of a front plate and elastic members fitted to the front plate in a display apparatus according to a third embodiment.

Referring to FIG. 8, a plurality of elastic members 24 are fitted to each of four sides of a front plate 13. The elastic members 24 fitted to the long sides and the short sides of the front plate 13 are identical to one another. The elastic members 24 are fitted to the four sides of the front plate 13 such that the elastic members 24 are connected to one another.

Figure 9:
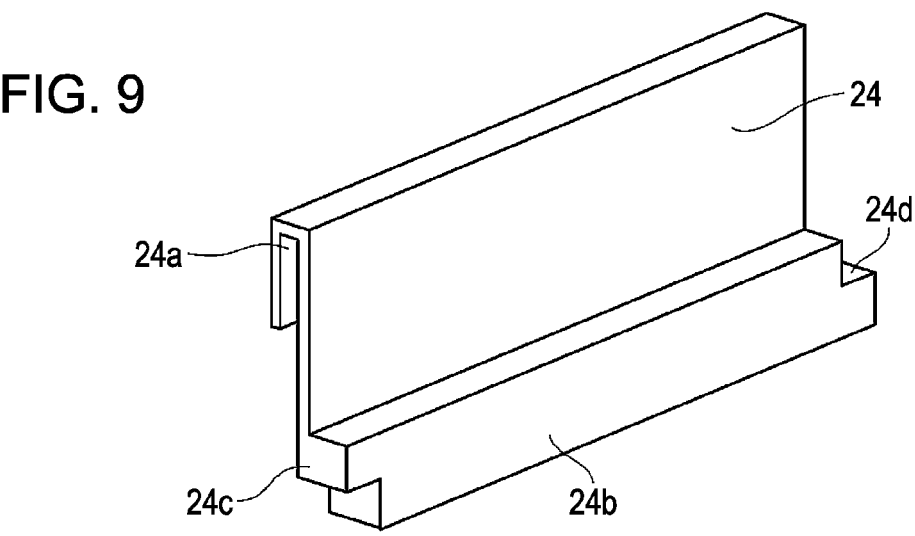
FIG. 9 is a perspective view illustrating the detailed structure of each of the elastic members shown in FIG. 8.

FIG. 9 is a perspective view illustrating the detailed structure of each of the elastic members shown in FIG. 8.

Referring to FIG. 9, each elastic member 24 includes a fitting portion 24a fitted to an edge portion of the front plate 13 and a contact portion 24b that comes into contact with the panel body 11. The elastic member 24 has a connecting portion 24c and a connecting portion 24d at the ends thereof. The connecting portion 24c is connected to the connecting portion 24d of the adjacent elastic member 24.

Figure 10:
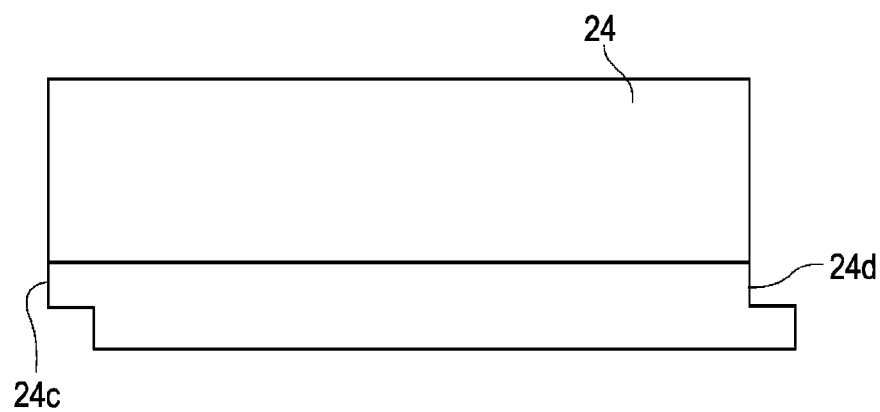
FIG. 10 is a side view illustrating the detailed structure of connecting portions of the elastic member shown in FIG. 9.
Figure 11:
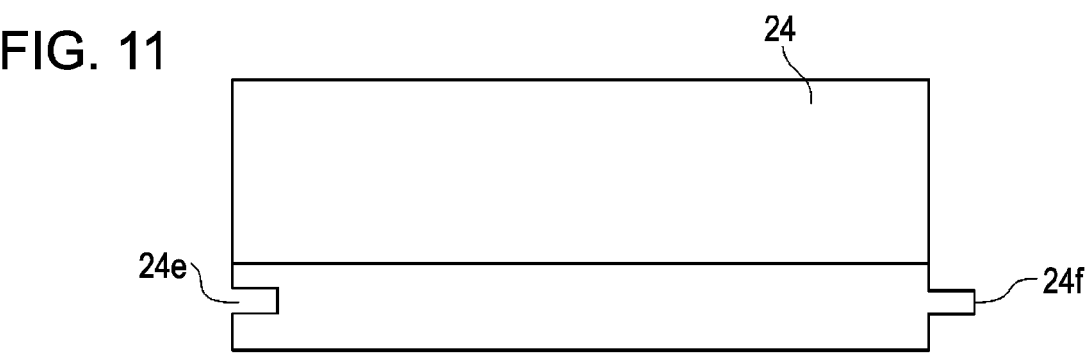
FIG. 11 is a side view illustrating another example of connecting portions of an elastic member.
Figure 12:
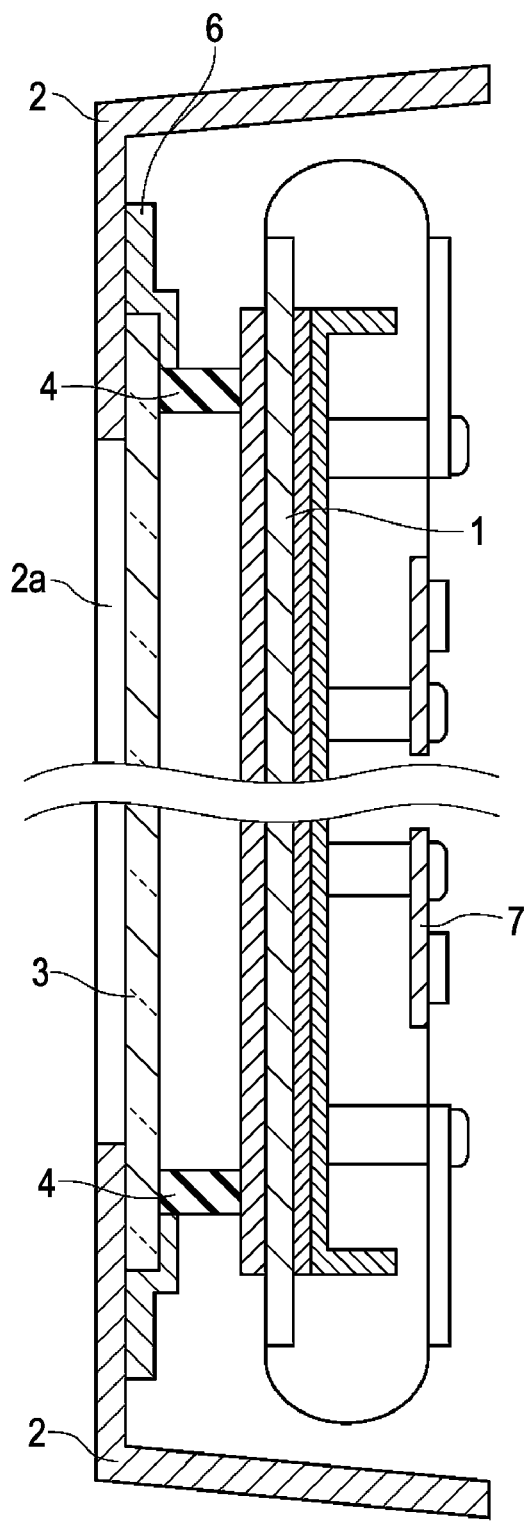
FIG. 12 is a diagram illustrating a plasma display apparatus of the related art.

FIG. 10 is a side view illustrating the detailed structure of the connecting portions of the elastic member shown in FIG. 9. FIG. 11 is a side view illustrating another example of connecting portions of an elastic member.

Referring to FIG. 10, each of the connecting portions 24c and 24d of the elastic member 24 has a step. When the adjacent elastic members 24 are connected to each other, the steps that face each other are fitted to each other.

In comparison, in FIG. 11, a connecting portion 24e has a recess, while a connecting portion 24f at the opposite end has a projection. When the adjacent elastic members 24 are connected to each other, the connecting portions 24e and 24f that face each other are fitted to each other. In either case, the connecting portions overlap with each other. Therefore, foreign matter, such as dust, can be prevented from entering the image display area through the gaps between the connecting portions of the elastic members 24.

When the elastic members 24 are fitted to the four sides of the front plate 13 in the above-described manner, the elastic members 24 having the identical structure can be used.

In addition, even when, for example, display apparatuses with different sizes are to be produced, the identical elastic members 24 can be used by, for example, reducing the number of elastic members 24 arranged along each side for the small display apparatuses. Thus, the identical components can be used for the products with different sizes.

The front plate according to the above-described embodiments may be applied to, for example, plasma display panel apparatuses. However, the front plate may also be applied to any type of plate-shaped members, such as a touch panel, placed in front of a display unit.

In addition, in the above-described embodiments, the elastic members are used as the dustproof members in consideration of workability and costs. The material of the elastic members is not limited as long as the material has elasticity and dustproof performance like those provided by rubber and silicone. According to the present invention, the dustproof members are not limited to elastic members as long as the dustproof members can be fitted to the front plate and can provide a dustproof effect by coming into tight contact with the front plate and the display panel. For example, the dustproof members may also be metal members.

As described above, according to the present invention, in the process of fixing the dustproof members to the front plate, the dustproof members are fixed without using an adhesive or the like by fitting the fitting portions of the dustproof members to the front plate. The dustproof members can be positioned by the end face of the front plate so that the dustproof members can be substantially linearly disposed. In addition, since it is not necessary to use the adhesive, no adhesive remains on the panel body or the front plate. Therefore, the disassemblability can be improved.

While the present invention has been described with reference to exemplary embodiments, it is to be understood that the invention is not limited to the disclosed exemplary embodiments. The scope of the following claims is to be accorded the broadest interpretation so as to encompass all modifications and equivalent structures and functions.

This application claims the benefit of Japanese Application No. 2007-220149 filed Aug. 27, 2007, which is hereby incorporated by reference herein in its entirety.

What is claimed is:

1. A display apparatus comprising:
   a bezel defining a portion of a housing configured to house a display panel, the bezel having an opening at which an image display area at a front side of the display panel is exposed;
   a front plate disposed in front of the display panel so as to cover the opening, the front plate disposed in front of the display panel and being spaced from the display panel; and
   a dustproof member having a fitting portion to fit an edge portion of the front plate and a contact portion and wherein a space is defined between the display panel and the front plate, the fitting portion having a hook shape and being fitted to the edge portion, the contact portion being pressed toward the front plate by the display panel and coming into tight contact with the front plate and the display panel,
   wherein the dustproof member includes a connecting portion for connecting with another dustproof member, which has a same shape as the dustproof member, and the length of the dustproof member is shorter than the length of one side of the front plate, and
   wherein a plurality of the dustproof members are connected to each other, the connected dustproof members being arrange along an outer periphery of the image display area.

2. The display apparatus according to claim 1, wherein the fitting portion has a gap whose dimension is equal to or smaller than a thickness of the edge portion of the front plate.

3. The display apparatus according to claim 1, wherein the dustproof member includes a first component corresponding to the fitting portion and a second component corresponding to the contact portion, the first and second components being separately provided and fixed to each other.

4. The display apparatus according to claim 1, further comprising:
   a metal member fixed to the bezel so as to press the dustproof member against the front plate,
   wherein each of the metal member and the dustproof member is made of a conductive material.

* * * * *